Nov. 2, 1948.                 L. B. MERRILL                    2,452,671
                           TRACK-LAYING TRACTOR
Filed April 1, 1944                                      2 Sheets-Sheet 1
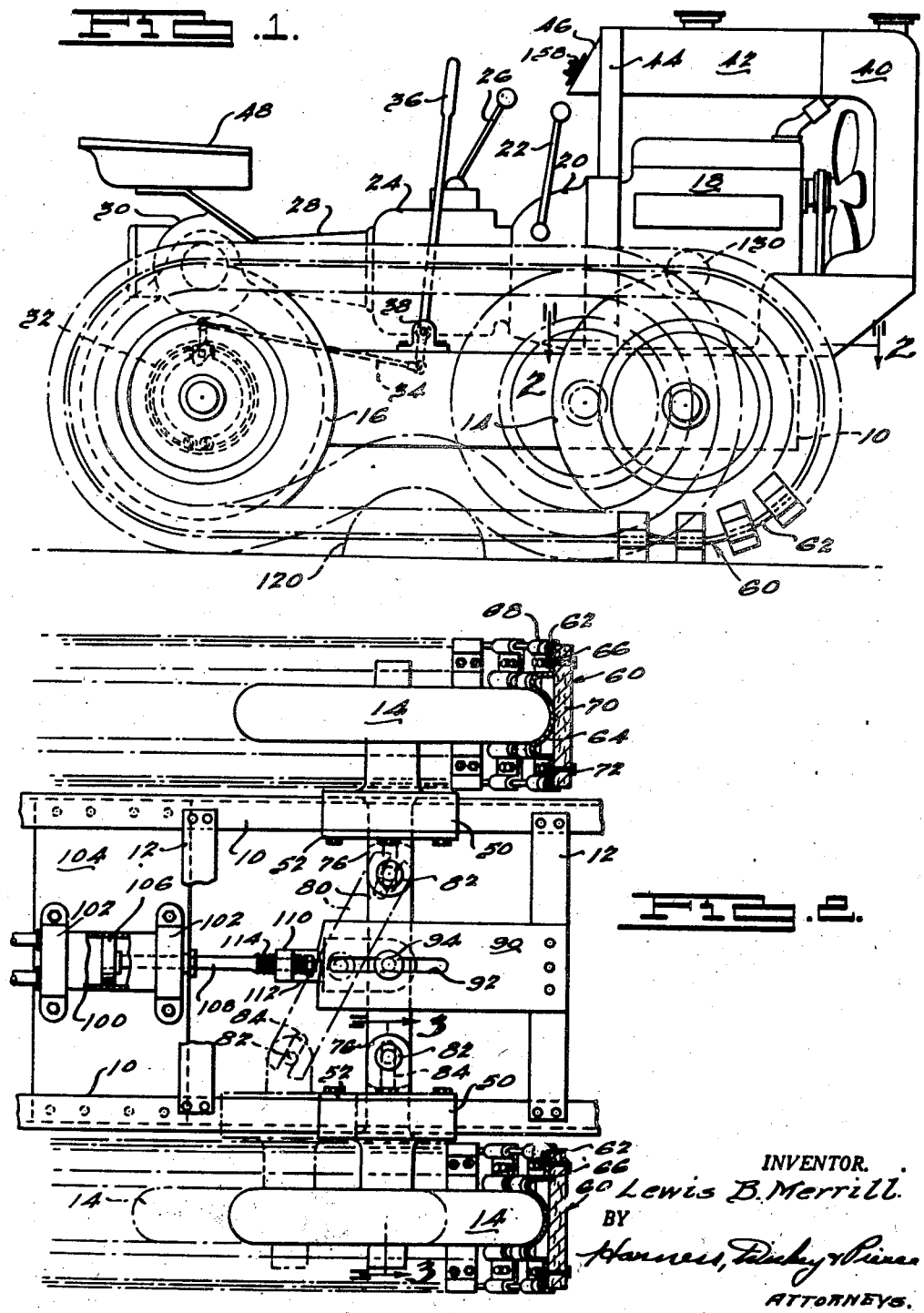
INVENTOR.
Lewis B. Merrill
BY
Harness, Dickey & Pierce
ATTORNEYS.

Nov. 2, 1948.  L. B. MERRILL  2,452,671
TRACK-LAYING TRACTOR
Filed April 1, 1944  2 Sheets-Sheet 2
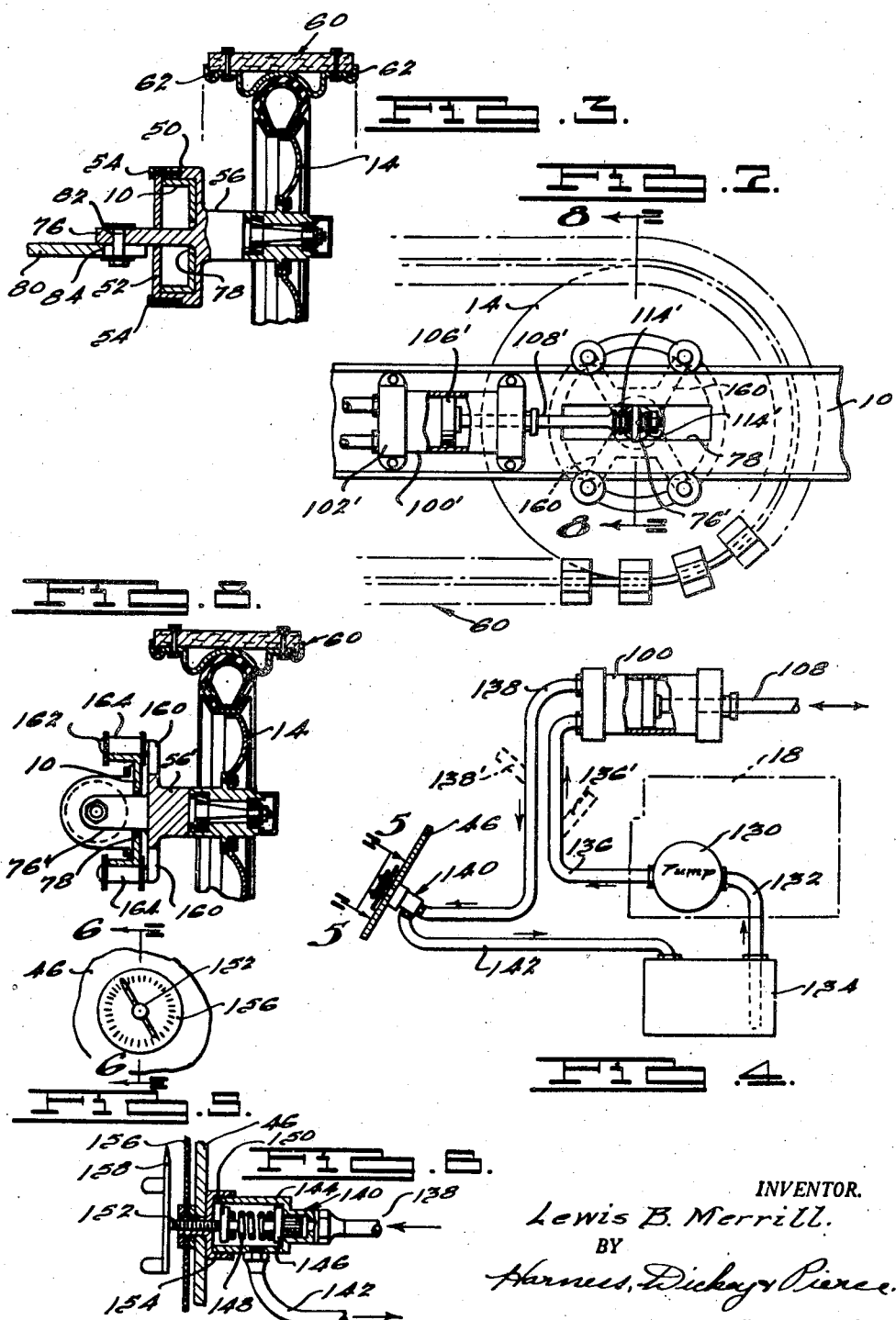
INVENTOR.
Lewis B. Merrill.
BY
Harness, Dickey & Pierce.
ATTORNEYS.

Patented Nov. 2, 1948

2,452,671

UNITED STATES PATENT OFFICE 2,452,671

TRACK-LAYING TRACTOR

Lewis B. Merrill, Baldwin, Mich., assignor to Harry V. Tutton, Detroit, Mich.

Application April 1, 1944, Serial No. 529,087

16 Claims. (Cl. 305—9)

This invention relates to track-laying tractors and has for its principal object the provision of a vehicle of this type of improved construction and operating characteristics.

Objects of the invention include the provision of a track-laying tractor so constructed and arranged as to minimize the stresses capable of being applied to the track; the provision of a track-laying tractor in which the traction of a track passing over an obstructing projection is increased as compared to its traction on level ground; the provision of a track-laying tractor as above described in which the track on each side of the tractor is trained around a pair of co-operating wheels and at least one of such wheels is bodily movable toward and from the other in response to stresses applied to the track in order to minimize such stresses; the provision of a construction as above described in which one wheel at each side of the vehicle over which the endless track is trained is guided for bodily movement toward and from the other of said wheels and fluid pressure means is provided for co-operating with each bodily movable wheel so constructed and arranged as to permit a material amount of such bodily movement and serving to maintain a constant tension on the endless track during such movement; the provision of a construction as above described in which the endless track is unsupported between the wheels; the provision of a construction as above described in which the endless track is driven through friction between it and the periphery of one of the wheels; the provision of a construction as above described in which the fluid pressure maintaining a tension on the track is variable at will by the operator and without interrupting the operation of the tractor; the provision of a construction as above described in which the fluid pressure means comprises one or more hydraulic cylinder-and-piston assemblies; and the provision of a construction as above described in which the connection between such hydraulic cylinder-and-piston assembly or assemblies and a shiftable wheel or wheels include yieldable buffer means.

The above being among the objects of the present invention, the same consists of certain novel features of construction and combinations of parts to be hereinafter described with reference to accompanying drawings, and then claimed, having the above as well as other objects in view.

In the accompanying drawings which illustrate suitable embodiments of the present invention and in which like numerals refer to like parts throughout the several different views, Fig. 1 is a more or less diagrammatic side elevational view of a track-laying tractor constructed in accordance with the present invention;

Fig. 2 is an enlarged, fragmentary, horizontal sectional view taken on the line 2—2 of Fig. 1;

Fig. 3 is a fragmentary, vertical sectional view taken on the line 3—3 of Fig. 2;

Fig. 4 is a more or less diagrammatic representation of the fluid pressure system employed for maintaining a tension on the endless tracks of the vehicle shown in the preceding views;

Fig. 5 is a fragmentary, enlarged face view of the pressure control valve and pointer or hand lever employed in the system shown in Fig. 4 and taken as looking in the direction of the arrows 5—5 of Fig. 4;

Fig. 6 is an enlarged, vertical sectional view taken on the line 6—6 of Fig. 5 and illustrating one form of valve mechanism that may be employed for variably controlling the pressure exerted on the bodily shiftable wheels by the system shown in Fig. 4;

Fig. 7 is a fragmentary, side elevational view showing a modified form of construction for mounting the bodily shiftable wheels on a tractor of the type shown in the preceding views and in which each bodily shiftable wheel is provided with an individual fluid pressure cylinder and piston assembly for maintaining its co-operating track under tension; and Fig. 8 is a fragmentary, vertical sectional view taken on the line 8—8 of Fig. 7.

The present invention relates to that type of track-laying tractor having a pair of wheels at each side thereof over which an endless track is trained. One of the wheels at each side is driven thereby to drive the corresponding track. In the broader aspects of the invention the wheels may be so constructed and arranged as to positively drive the track, that is, through interengaging teeth or the like, or friction alone between the track and the driving wheel may be relied upon for driving the track. The latter type of construction is preferred, and it is shown in the drawings by way of illustration, particularly in view of the fact that in some of its narrower aspects, the present invention is limited to such type of drive.

The principal feature of the invention consists in so mounting one of the wheels on each side of the vehicle as to provide for a material amount of bodily shiftable movement thereof toward and away from its associated wheel on the same side of the vehicle so that the lower run of the endless track on each side of the vehicle, which is unsupported between the wheels, in passing over an upwardly projecting obstruction or the like may yield upwardly between the wheels in more or less wrapping relation to the obstruction, the shiftable wheel shifting to accommodate such yielding, thereby to reduce the stress on the endless track to which it would otherwise be subjected under such conditions and to obtain an added traction by reason of the wrapping engagement of the track on the obstruction.

Constructions have heretofore been proposed in which endless tracks have passed over a pair of wheels in a vehicle of the type described and in which one of the wheels has been provided with a limited amount of movement toward and from the other of the wheels and is constantly urged away from such other of said wheels by means of a spring. In these prior constructions the springs were provided in order to shift the shiftable wheel sufficiently to take up wear or stretching occurring in the endless track, but in all such cases, as far as I am aware, the amount of movement so provided has been insufficient to permit the attainment of results commensurate with that of the present invention, and, furthermore, any tendency of the shiftable wheel to move toward the co-operating wheel due to the track passing over an obstruction or the like would build up, if permitted, an undesirable tension in the track through compression of such spring means.

In the practice of the present invention the bodily shiftable wheel on each side of the tractor is constantly urged away from the co-operating wheel on the same side and without materially increasing the tension applied to the track when drawn toward such co-operating wheel by fluid pressure actuated means. Such fluid pressure actuating means is preferably so constructed and arranged as to maintain a constant tension on the chain regardless of the shiftable position of the shiftable wheel. Control means is provided permitting the operator of the tractor to vary the tension applied to the endless track through the force of the fluid pressure operating means during operation of the vehicle, thereby enabling, where a friction drive is employed between the wheels and the endless track, the degree of friction existing between these parts to be varied at will and while the vehicle is operating.

In the broader aspects of the invention any suitable or conventional type of endless track may be employed, but for reasons of economy of manufacture, longevity of service, and efficiency of operation, it is preferable to employ that type of track made up of two or more endless, flexible cables connected together by transversely-disposed cleats suitably secured thereto and spaced from one another over the length of the cable. For this reason this type of endless track is shown by way of illustration in the drawings.

Referring now to the drawings and particularly to Figs. 1 and 2, the tractor there shown comprises a pair of frame side members 10 suitably and rigidly connected together at intervals over their length by means of frame cross members 12. Although the frame side members 10 and cross members 12 may be of any suitable or conventional cross-sectional conformation, by way of illustration and as best brought out in Fig. 3, the side members 10 are shown as of channel section arranged with the open side of the channel facing inwardly. The frame thus described is supported at each side thereof by means of a pair of wheels comprising a front wheel such as 14 and a rear wheel 16, these wheels being illustrated as of a conventional rubber tired type. In accordance with the present invention, one of the wheels, either the wheel 14 or 16 of each side of the tractor, is mounted for bodily shiftable movement toward and from the other longitudinally of the side frames 10, and the remaining wheel is held against movement longitudinally of the frame. In this latter aspect of the invention it makes no difference whether the front wheel 14 or the rear wheel 16 on each side of the vehicle is a bodily shiftable wheel, but for the purpose of illustration and as will usually be preferable, the wheel 14 is illustrated in the drawings as being the shiftable wheel. The fore and aft spacing of the wheels 14 and 16 shown forms no part of the present invention, a desired amount of spacing for such wheels being disclosed and claimed in the copending application of Harry V. Tutton on Tracklaying tractor filed June 10, 1947, and serially numbered 753,787.

In the broader aspects of the invention it likewise makes no difference whether the fixed wheel or the shiftable wheel on each side of the vehicle constitutes the driving wheel, but inasmuch as it will usually be simpler and involve less mechanism to drive the fixed wheel, this is the construction shown by way of illustration. To this end a conventional internal combustion engine indicated generally at 18 is mounted between the frame side members 10 adjacent the forward ends thereof and has rigidly secured to the rear end thereof a clutch housing 20 within which a conventional type of clutch is enclosed and which is controlled by means of a clutch lever 22. A change speed transmission indicated generally at 24 and provided with a control lever 26 is rigidly secured to the rear end of the clutch housing 20. A drive shaft housing 28 is rigidly fixed to the rear end of a transmission 24 and in turn is rigidly connected to a differential housing 30. It will be understood that in accordance with the conventional practice, the power from the engine 18 is transmitted to the clutch in the housing 20 through the transmission 24 to a drive shaft enclosed in the housing 28 to a conventional differential mechanism within the housing 30, the latter being connected in any suitable or conventional manner to each of the rear wheels 16. The wheels 16 may be mounted in any suitable or conventional manner in supporting relation to the frame side members 10 and against material movement longitudinally thereof.

Steering is accomplished by braking either one or the other of the rear wheels 16, and to this end each rear wheel 16 has associated therewith a conventional type of wheel brake mechanism indicated generally at 32, each brake mechanism 32 being connected, as for instance by means of a rod 34, with a hand lever 36, pivotally mounted as by means of a bracket 38, on the corresponding side of the vehicle.

A conventional radiator, such as 40, is mounted on the frame of the front end of the vehicle and conventionally connected to the engine 18 for usual reasons, and a fuel tank 42 is mounted between the upper end of the radiator 40 and a dash structure 44 secured to the frame of the vehicle adjacent the rear end of the engine 18. The dash structure 44 is shown as carrying an instrument panel indicated generally at 46. A conventional seat 48 is, of course, provided for the operator.

In accordance with the present invention the front wheels 14 are mounted for bodily shiftable movement toward and from the rear wheels 16 on the corresponding side of the tractor. In the particular construction shown in Figs. 1 to 3, inclusive, the front wheels 14 are mounted for such shiftable movement in the following manner. A channel-shaped member 50 of material length is mounted on each frame side member 10 adjacent the forward end thereof for sliding movement longitudinally thereof. As best brought out in Fig. 3, each member 50 faces in the same direction as its corresponding frame side member 10 in encompassing relation with respect to the outer faces thereof, and its inner edges terminate in substantially flush relation with respect to the corresponding frame side member 10. A plate member 52 overlies the inner edges of each member 50 and the corresponding inner edges of the corresponding frame side member 10 and is secured to the member 50 as by means of screws 54. Thus, each member 50, while slidably mounted on its corresponding frame side member 10 for movement longitudinally of the latter, is securely held against movement in any other direction.

Each member 50 is provided with a laterally outwardly projecting spindle 56 rigidly fixed thereto, and preferably formed integrally therewith and freely rotatably mounted upon the outer end of each spindle 56 is the corresponding front wheel 14.

While, as previously explained, in the broader aspects of the invention the particular type or construction of the endless track which is trained over the wheels 14 and 16 at each side of the vehicle is more or less unimportant, in the present case such endless track which is here indicated generally at 60 comprises a pair of endless flexible cables 62 which are connected together at frequent intervals over their length by transversely-extending spaced cleats anchored to the cables 62. Each cleat comprises a sheet metal base having a central inwardly-facing concave portion 64 preferably curved into conformance with the curvature of the co-operating peripheral portion of the corresponding wheel 16. a flat outwardly-offset portion 66 at each end thereof, and each of which terminates in an outwardly-directed channel end portion 68 in which the corresponding cables 62 are received. It will be noted that the outer walls of the channels 68 project radially of the corresponding wheel 16 outwardly beyond the plane of the corresponding flat surface 66. A flat, rectangularly-sectioned member 70, illustrated as being formed from wood, extends between the outer walls of the channels 68 of each cleat member and rests against the outer faces of the flat portion 66 to which it is securely clamped by means of bolts or screws 72 which thereby serve to simultaneously clamp the cable 62 to the cleats thus formed.

In the construction illustrated in Figs. 1 to 3 inclusive, in order to constantly urge the front wheels 14 away from the rear wheels 16 during operation of the vehicle, the following mechanism is provided. As perhaps best brought out in Fig. 3, each member 50 is provided with a rigid and preferably integrally-formed inwardly-projecting arm 76 preferably aligned with the spindle 56 thereof. The corresponding channel 10 is slotted as at 78 longitudinally thereof so as to provide for movement of the member 50 longitudinally of the corresponding frame side member 10 without interference. A bar member 80 is extended between the arms 76 on the opposite sides of the tractor, and each outer end is connected to the corresponding arm 76 by means of a pin 82. The pin 82 extends through a central slot 84 in the corresponding outer end of the bar 80. It will thus be appreciated, and as best brought out in Fig. 2, that with this type of connection between the bar 80 and the arms 76, one member 50 may move longitudinally of its corresponding frame side member 10 and relative to the other member 50 without restriction because of the interconnection of the members 50 through the bar member 80. However, in order to maintain the bar member 80 in central position with respect to the frame side members 10, a horizontally-disposed plate member 90 is secured between two or more frame cross members 12 centrally of the side frame members 10 at the forward portion of the vehicle and is provided with a central longitudinally-extending slot 92 therein. A pin 94 secured to the bar member 80 midway between its ends projects up through the slot 92 and is longitudinally slidable therein, thus accomplishing the desired purpose.

In accordance with the present invention and in order to maintain a pressure on each of the wheels 14 tending to constantly urge it forward away from the corresponding wheel 16 and at the same time so constructed and arranged as to permit a material bodily shiftable movement of either of the wheels 14 longitudinally of the frame 10 for the purpose as stated, the following mechanism is provided. A cylinder 100 is mounted in fixed position with respect to the frame of the vehicle, as for instance through brackets 102 fixed to a frame cross member or plate here indicated at 104 and as carried by the frame side members 10 midway between the frame side members 10 and with its axis parallel to the path of sliding movement of the members 50 on the frame side members 10. The cylinder 100 is interiorly provided with a piston 106 to which is secured a piston rod 108 which projects through the forward end of the cylinder 100. At its forward end the piston rod 108 slidably receives thereon a collar 110 which closely but slidably fits the same and which is rigidly fixed to the rear end of an arm 112 the forward end of which embraces the pin 94 connecting the bar 80 to the plate 90.

Short coil springs 114 are preferably provided in encircling relation with respect to the piston rod 108 on each side of the sleeve 110 and are maintained under compression between the sleeve 110 and suitable shoulders formed or carried by the piston rod 108 to lessen shock in operation through the connection as will hereinafter be better appreciated.

Fluid pressure applied internally of the cylinder 100 against the rear face of the piston 106 serves to urge the piston 106, and consequently the piston rod 108 and arm 112 forwardly of the vehicle. The arm 112 acting through the pin 94 transmits this force to the bar member 80 and the bar member 80 through the pins 82 and arms 76 to the members 50 and consequently through the spindles 56 to the wheels 14, the wheels 14 being correspondingly urged forwardly and away from the wheels 16, thereby causing the tracks 60 to be tensioned about their corresponding wheels 14 and 16, thereby effecting a frictional driving relation with respect to the tracks 60 and the rear wheels 16.

Where the pressure acting against the piston 106 is maintained at a constant value, it will be appreciated that each track 60 will grip its corresponding wheels 14 and 16 with the same force. It will also be appreciated that in the event the track 60 on either side of the vehicles runs over an obstruction, such as indicated at 120 in Fig. 1, providing the pressure acting on piston 106 is not excessive and as is desirable in accordance with the present invention, as the track 60 between the wheels 14 and 16 on such side of the vehicle encounters such obstruction 120, the track 60 will wrap itself around such obstruction as indicated in Fig. 1 without causing a corresponding lifting of such side of the vehicle while the obstruction is located between the wheels 14 and 16.

Under such conditions the corresponding front wheel 14 will have moved backwardly towards the corresponding rear wheel 16 to permit this described yielding of the track 60 to occur. Where such an obstruction 120, and which in practice may be a stone, stump, or the like, is encountered by the track on the right side of the vehicle as assumed in Figs. 1 and 2, then the right front wheel 14 will move rearwardly under such condition as indicated by the position thereof shown in dotted lines, the track 60 yielding in the manner also shown by dotted lines in Fig. 1. It will, of course, be appreciated that either of the tracks 60 and either of the front wheels 14 will yield in the manner described whenever either of them passes over such obstruction, and that where both tracks 60 pass over an obstructon simultaneously, both front wheels 14 and their corresponding tracks 60 will correspondingly yield.

The amount of yielding thus provided by the present invention must be a material amount of yielding in order to realize the amount of benefit of the present invention, and such yielding should be accomplished without materially increasing the tension desirably maintained in the track 60 under such condition. In other words, the yielding of the tracks 60 under such conditions should not be accomplished by an excessive increase in the tension applied to the track, and the amount of yielding should be sufficient to permit the concavity of material depth to be formed in the tracks between the wheels. To obtain this effect it will be understood that the fluid pressure means tending to stretch the tracks 60 over the wheels 14 and 16 is necessarily insufficient, or substantially so, to permit one or both sides of the tractor to be lifted solely through engagement of the unsupported portion or portions of the lower run or runs of the tracks between the wheels through engagement thereof with an obstruction such as 120 and where the necessary yielding of the track or tracks is within the range permitted through shifting of the wheel or wheels 14. In this respect it will be appreciated that by permitting the tracks 60 to yield upwardly to the extent described in passing over an obstruction, the tensile stress to which the tracks are subjected under such conditions will usually be a fraction of that to which they would be subjected to in case the proportional share of the weight of the tractor was attempted to be carried by an unsupported run of the tracks and where the tracks are not permitted to yield as in the present invention. Another important advantage of this feature is that when the track thus yields in passing over an obstruction, it tends to wrap itself about such obstruction with the wheels still tractively engaging the ground and thereby adds to the tractive effect of the track with respect to the ground at the very time such increased tractive effect is desired. It will be appreciated that in conventional constructions where the tracks are incapable of yielding as in the present invention, when a track passes over an obstruction, the tractive effort thereof is decreased, sometimes to only point engagement with the obstruction only, thus creating an undesirable condition.

It will therefore be appreciated that by reason of the construction thus provided by the present invention, means are provided whereby a desirable and constant tension may be applied to the tracks 60 to maintain them in frictional or otherwise embracing relation with respect to the cooperating wheels, and yet this tension will not be materially increased because of the tracks riding over an obstruction which would otherwise tend to support the vehicle through the tracks on such obstruction and subject the tracks to unduly high stresses which would foster early destruction of the same.

Cables such as the cable 62 or any other equivalent or corresponding structures of other tracks will of course stretch and/or wear in time, and the fluid pressure cylinder and piston assembly or assemblies provided for in accordance with the present invention will of course take up such wear as is developed, this being somewhat in accordance with structures heretofore proposed wherein at least one of the wheels has been urged away from its corresponding wheel on the same side of the vehicle by means of spring pressure. In the present case, however, any shifting of the wheel is not accompanied by any variation in the pressure applied to the wheel to the track as must necessarily occur in such spring-pressed types of construction.

In accordance with the broader aspects of the present invention, either gas or liquid under pressure may be introduced into the cylinder 100 in order to urge the piston 106 forwardly. Liquid or hydraulic pressure will ordinarily be found preferable, and its use will be assumed for the purpose of illustration. A hydraulic system satisfactory for use in connection with the cylinder 100 is shown in Fig. 4, from which it will be seen that a liquid pump illustrated diagrammatically at 130 is suitably mounted upon the engine 18 and suitably or conventionally connected thereto for driving movement simultaneously with operation of the engine 18. The pump 130 is provided with a suction tube 132 leading to a point near the bottom end of a reservoir 134 which may be mounted in any suitable position on the tractor. The pump is provided with a discharge tube or pipe 136 which is connected into the rear end of the cylinder 100 as indicated. A discharge pipe 138 is also connected into the rear end of the cylinder 100 and leads to a pressure relief or regulating valve indicated generally at 140 and from which a second tube 142 leads back to the oil reservoir 134. While any suitable or conventional type of pressure-regulating or relief valve 140 may be employed, that shown and as best brought out in Fig. 6 comprises a hollow body 144 to the rear end of which the tube or pipe 138 is connected. A disc valve 146 is mounted in obstructing relation with respect to the path of flow of liquid from the tube 148 into the housing 144 and is constantly urged towards closed position by means of a coil spring 148. The tension of the spring 148 is controlled by means of a stop 150 carried on a stem 152 threaded in the cap 154 for the housing 144. As will be appreciated, by threading stem 152 inwardly or outwardly, the pressure of the spring 148 acting on the valve 146, and consequently the amount of pressure required to be built up in the cylinder 100 before the valve 146 will lift and thus limit such pressure may be conveniently varied or regulated.

Preferably the control valve 140 is mounted on the instrument panel 46, a dial 156 being arranged in surrounding relationship with respect to the stem 152 as shown, and the stem 152 being provided with a manually operable control handle or pointer 158 arranged in co-operating relationship with respect to the scale on the dial 156.

Thus the operator of the tractor, by simply turning the pointer 158, may adjust the tension applied to the tracks 60 during operation and cause such tension to conform to that which appears to be most desirable under any particular circumstances of pulling effort required to be exerted, character of surface being traveled over, and for other conditions of operation.

In accordance with the last-mentioned consideration, it will be appreciated that in the interests of longevity for the tracks 60 and of the tires for the wheels 14 and 16 where such tires are employed, it is desirable to use the minimum tension of the tracks 60 commensurate with the condition that was of service at any particular time. It may be desirable that the tension be such that the driving wheel 16 will slip on the tracks before the engine stalls. It will be appreciated that this condition will vary greatly, depending upon whether the transmission is in low gear, high gear, or some intermediate gear, the resistance offered by the load being pulled, and other conditions. By providing means such as the valve 140 whereby the tension of the tracks 60 may be instantly varied during operation, these conditions may be quickly compensated for without interrupting operation.

It will be appreciated that in order for the shifting of the shiftable wheels to occur fast enough in service to permit the tracks 60 to accommodate themselves to obstructions met with, the various tubes or pipes described connecting the pump 130 with the cylinder 100 and the cylinder 100 with the reservoir 134 should be of a size permitting such movement to be accomplished and the capacity of the pump 130 be accordingly great. In this connection it will be appreciated that the valve 140 serves as a pressure relief valve for the pump itself and thus acts to limit the maximum pressure which may be built up by the pump in accordance with the setting of the valve 140. It might also be noted at this point that the springs 114 in the connection between the piston 106 and the bar 80 act to cushion the shock which the tracks 60 might otherwise be subjected to when a track 60 meets an obstruction when traveling at a material speed, these springs acting as buffers reducing the effect of such shocks and helping to provide a time element during which the inertia of the pressure-actuated elements may be overcome.

With the arrangement thus far described it will be appreciated that when the tractor engine 18 is stopped, the pressure in the hydraulic system will ordinarily drop to zero within a short time through leakages which will inevitably occur in any hydraulic system. The drop-in pressure may, of course, be accelerated by moving the valve 140 to low-pressure position. This feature, and particularly the feature of enabling the pressure in the hydraulic system to be eliminated, is of material advantage in the construction shown, for the following reasons. If it is desired to remove one of the tracks 60, all that is required is that the pressure in the hydraulic system be reduced to zero and that the front wheel on the track desired to be removed or replaced be moved to the rearward extent of its limited movement, either manually or by running the tractor forwardly until such position is reached, whereupon the track is sufficiently loosened upon the corresponding wheels 14 and 16 to permit it to be simply pulled off the tops of the wheels. If this is done while the corresponding side of the tractor is raised off the ground, the track may be completely removed; otherwise after the top portion of the track has been pulled off the wheel, the tractor may be run forwardly until it has run off the bottom portion of the track. The track may be replaced by a simple reversal of the above-described operation. It therefore provides the means by which a damaged track may be removed and replaced by a new one, or, where it is desired to replace one track by a track which is either wider or narrower in order to accommodate the tractor to some particular type of surface to be operated upon, this may be accomplished accordingly in a quick and easy manner.

It is not necessary that a single piston 100 be connected through a bar member such as 80 to both of the bodily shiftable wheels in order to accomplish the purposes of the present invention. It will be appreciated that a cylinder and piston assembly individual to each wheel may be employed in place of the construction above described and jointly connected into the hydraulic system in substantially the same manner as in the above-described construction. Such a construction is illustrated in Figs. 7 and 8, and in view of the fact that under such conditions the only changes necessary will be the changes required to connect each bodily-shiftable wheel to its individual cylinder and piston assembly, this portion only of the tractor is shown, it being understood that otherwise and except for the necessity of connecting the pump to both of the cylinders and both of the cylinders to the control valve, the rest of the construction may be identical to that already described. Opportunity, however, is taken in the construction illustrated in Figs. 7 and 8 to illustrate a modified manner of mounting the shiftable wheels upon the frame side members 10.

In Figs. 7 and 8 each wheel spindle here illustrated at 56', instead of being connected to a channel sectioned member slidably embracing the corresponding frame side member 10, is connected to a spider-like structure having four angularly-spaced arms 160, each of which terminates in an inwardly-directed spindle or pin portion 162 upon which a spool-like roller 164 is rotatably mounted. The flanges of the spool-like rollers 164 are spaced from each other axially of the spool by a distance equal to the width of the corresponding frame side member 10, and the rollers 164 are so spaced from one another that two of them embrace the upper face of the channel 10, while the remaining two embrace the lower face thereof. Each spindle 56', and therefore the corresponding wheel 14, is therefore mounted for bodily shiftable movement longitudinally of the frame side member 10 in the same general manner as in the construction first described.

In this case the spindle 56', similarly to the construction first described, is provided with an inwardly projecting arm 76' likewise passing through the slot 78 in the frame side member 10. In this case a cylinder and piston assembly which may be identical to that first described and here illustrated at 100' for the cylinder and 106' for the piston is suitably mounted on the inner face of each frame side member 10 rearwardly of the corresponding wheel spindle 56', as, for instance, by means of brackets 102', similar to those first described. The rod 108' for each piston 106' in this case extends forwardly in parallel and central relation with respect to the corresponding frame side member and is connected through buffer springs 114', similar to the springs 114 first described, to the corresponding arm 76'. Thus each piston 106' acts to resiliently urge its corresponding wheel 14 in a forwardly direction in the same general manner as in the construction first described.

The hydraulic system for this last-described construction may be identical to that employed in the first-described construction and as illustrated in Fig. 4, with the exception that the discharge tube 136 for the pump will be provided with a branch such as 136' and the discharge tube 138 will be provided with a branch such as 138', the tubes 136 and 138 being connected to one of the cylinders 100', while the branches 136' and 138' will be connected to the other of such cylinders.

The operation of the last-described construction will be essentially the same as the first-described construction together with all of the attendant advantages.

Having thus described my invention, what I claim by Letters Patent is:

1. In a tractor vehicle of the class wherein a pair of wheels are provided at each side thereof and an endless track is trained over the wheels on each side of the vehicle, the combination with said tractor vehicle and one of the wheels on each side thereof of means for mounting each of said one wheels with respect to said vehicle operable to permit bodily shiftable movement thereof toward and from the other of said wheels on the same side of the vehicle, and fluid pressure means operable to constantly urge said shiftable wheels away from said others of said wheels.

2. The combination with a tractor vehicle of the class wherein a frame is provided with a pair of supporting wheels on each side thereof and an endless track is trained about the wheels on each side thereof, the combination with said frame and one of said wheels on each side thereof of means for mounting said one of said wheels for bodily shiftable movement toward and from the other of said wheels on the same side of the vehicle, fluid pressure means operable to constantly urge said shiftable wheels away from said other of said wheels, and means for varying the force exerted by said fluid pressure means at the will of the operator during operation of said vehicle.

3. In a tractor vehicle, in combination, a pair of wheels on each side of said vehicle spaced from each other longitudinally of said vehicle, a track trained over the wheels on each side of said vehicle and its lower run being unsupported between said wheels, means mounting one of said wheels of each pair of said wheels for bodily shiftable movement toward and from the other of said wheels of each pair of said wheels, and fluid pressure means constantly urging the movable wheel on each side of said vehicle away from the other of said wheels on the same side of said vehicle whereby to maintain said tracks under tension, said fluid pressure means including pressure control means so constructed and arranged that the force applied to said movable wheels by said fluid pressure means creates a tension in said tracks less than that required to support a side of said vehicle solely through said unsupported portion of the lower run of the corresponding track therefor while the corresponding of said movable wheels is short of its permissible bodily movement toward the corresponding other of said wheels.

4. In a tractor vehicle of the class wherein a pair of wheels are provided at each side of the vehicle, and a track is trained over the wheels on each side of said vehicle and the lower run of each track is unsupported between said wheels, the combination with one of said wheels of each of said pair of wheels of means for mounting it for bodily shiftable movement toward and from the other of said wheels on the same side of said vehicle, and fluid pressure means constantly urging each movable wheel away from the other of said wheels on the corresponding side of said vehicle so as to maintain the corresponding said track under tension, said fluid pressure means including pressure control means so constructed and arranged that the tension applied to said corresponding track by said fluid pressure means is less than that required to support the corresponding side of said vehicle solely through engagement of the unsupported portion of the lower run of said corresponding track thereof with a surface when said movable wheel is short of its permissible limit of movement toward the corresponding wheel on the same side of said vehicle.

5. In a tractor vehicle of the class wherein a pair of wheels are provided on each side of the vehicle, a flexible track is trained over the wheels on each side of said vehicle and the lower run thereof is substantially unsupportd between said wheels, and means are provided for driving one of said wheels, the combination with the other of said wheels of means for mounting it for bodily shiftable movement toward and from said driven wheel, and fluid pressure means operable to urge said bodily shiftable wheel away from said driven wheel whereby to maintain said track under tension.

6. In a tractor vehicle of the class wherein a pair of wheels are provided on each side of the vehicle, a flexible track is trained over the wheels on each side of said vehicle and the lower run thereof is substantially unsupported between said wheels, and means are provided for driving one of said wheels, the combination with the other of said wheels of means for mounting it for bodily shiftable movement toward and from said driven wheel, fluid pressure means operable to urge said bodily shiftable wheel away from said driven wheel whereby to maintain said track under tension, and means operable to limit the force exerted by said fluid pressure means.

7. In a tractor vehicle of the class wherein a pair of wheels are provided on each side of the vehicle, a flexible track is trained over the wheels on each side of said vehicle and the lower run thereof is substantially unsupported between said wheels, and means are provided for driving one of said wheels, the combination with the other of said wheels of means for mounting it for bodily shiftable movement toward and from said driven wheel, fluid pressure means operable to urge said bodily shiftable wheel away from said driven wheel whereby to maintain said track under tension, means operable to limit the force exerted by said fluid pressure means, and means operable at will by the operator of said vehicle during operation thereof for varying the effect of the last-mentioned means.

8. In a tractor vehicle of the class wherein there is a power plant unit comprising an engine, clutch-and-change-speed mechanism and a final drive mechanism all secured together as a unit, a wheel on each side of said vehicle is operatively connected to said final drive unit for receiving driving movement therefrom, and a second wheel is positioned on each side of said vehicle in longitudinally-spaced relation with respect to the first-mentioned wheels, the combination with said second wheels of means operatively interconnecting the same with said unit for bodily shiftable movement thereof toward and from their corresponding first-mentioned wheels, fluid pressure means including a cylinder and piston means interconnecting said second wheels with said unit, means including a pump driven by said engine for applying fluid pressure to said cylinder and piston means whereby to urge said second wheels bodily away from said first-mentioned wheels, and a flexible track trained over the wheels on each side of said vehicle and limiting the bodily shiftable movement of each of said second wheels away from its corresponding first-mentioned wheel.

9. In a tractor vehicle of the class wherein there is a power plant unit comprising an engine, clutch-and-change-speed mechanism and a final drive mechanism all secured together as a unit, a wheel on each side of said vehicle is operatively connected to said final drive unit for receiving driving movement therefrom, and a second wheel is positioned on each side of said vehicle in longitudinally-spaced relation with respect to the first-mentioned wheels, the combination with said second wheels of means operatively interconnecting the same with said unit for bodily shiftable movement thereof toward and from their corresponding first-mentioned wheels, fluid pressure means including a cylinder and piston means interconnecting said second wheels with said unit, means including a pump driven by said engine for applying fluid pressure to said cylinder and piston means whereby to urge said second wheels bodily away from said first-mentioned wheels, a flexible track trained over the wheels on each side of said vehicle and limiting the bodily shiftable movement of each of said second wheels away from its corresponding first-mentioned wheel, and means operatively connected to said cylinder and piston means operable to limit the fluid pressures existing therein.

10. In a tractor vehicle of the class wherein there is a power plant unit comprising an engine, clutch-and-change-speed mechanism and a final drive mechanism all secured together as a unit, a wheel on each side of said vehicle is operatively connected to said final drive unit for receiving driving movement therefrom, and a second wheel is positioned on each side of said vehicle in longitudinally-spaced relation with respect to the first-mentioned wheels, the combination with said second wheels of means operatively interconnecting the same with said unit for bodily shiftable movement thereof toward and from their corresponding first-mentioned wheels, fluid pressure means including a cylinder and piston means interconnecting said second wheels with said unit, means including a pump driven by said engine for applying fluid pressure to said cylinder and piston means whereby to urge said second wheels bodily away from said first-mentioned wheels, a flexible track trained over the wheels on each side of said vehicle and limiting the bodily shiftable movement of each of said second wheels away from its corresponding first-mentioned wheel, means operatively connected to said cylinder and piston means operable to limit the fluid pressures existing therein, and means operable at will for varying the operation of the last-mentioned means whereby to limit the amount of pressure capable of existing in said piston and cylinder means as controlled by said last-mentioned means.

11. In a tractor vehicle, in combination, a frame, a wheel secured to said frame at each side thereof and held against substantial movement longitudinally of said frame, means for driving said wheels, means mounted at each side of said frame for slidable movement longitudinally thereof in spaced relation longitudinally of said frame from the first-mentioned wheels, a spindle carried by each of said slidable means, a wheel rotatably mounted on each of said spindles, a flexible track trained around both wheels on each side of said vehicle, and fluid pressure operated means operatively connected with said slidable means constantly urging said slidable means in a direction to place said tracks under tension.

12. In a tractor vehicle, in combination, a frame, a wheel secured to said frame at each side thereof and held against substantial movement longitudinally of said frame, means for driving said wheels, means mounted at each side of said frame for slidable movement longitudinally thereof in spaced relation longitudinally of said frame from the first-mentioned wheels, a spindle carried by each of said slidable means, a wheel rotatably mounted on each of said spindles, a flexible track trained around both wheels on each side of said vehicle, means articulated with respect to both of said slidable means interconnecting the same, and fluid pressure operated means acting through said articulated means urging said slidable means and said wheels carried thereby away from the other of said wheels.

13. In a tractor vehicle, in combination, a frame, a wheel secured to said frame at each side thereof and held against substantial movement longitudinally of said frame, means for driving said wheels, means mounted at each side of said frame for slidable movement longitudinally thereof in spaced relation longitudinally of said frame from the first-mentioned wheels, a spindle carried by each of said slidable means, a wheel rotatably mounted on each of said spindles, a flexible track trained around both wheels on each side of said vehicle, a cylinder-and-piston assembly operatively interconnected between each of said slidable means and said frame, and means for applying fluid pressure to said cylinder-and-piston assembly whereby to urge said slidable means away from the first-mentioned wheels.

14. In a vehicle, in combination, laterally spaced pairs of wheels, the wheels of each pair arranged in tandem relation and spaced from each other, an endless track trained over each pair of wheels, the lower run of each track being unsupported between said wheels, means mounting one wheel of each pair for bodily shiftable movement toward and from the other wheel in said pair, means constantly urging the shiftable wheels away from the other of said wheels whereby to maintain said tracks under tension, and means associated with said last-mentioned means for maintaining equal tensions on said tracks at all times regardless of the externally applied forces on said tracks or the position of either of said shiftable wheels relative to the other wheel with which it is associated.

15. In a tractor vehicle, in combination, a pair of wheels on each side of said vehicle spaced from each other longitudinally of said vehicle, an endless track trained over the wheels on each side of said vehicle and its lower run being unsupported between said wheels, means mounting one of said wheels of each pair of said wheels for bodily shiftable movement toward and from the other of said wheels of each pair of said wheels, means constantly urging the shiftable wheel of each pair of said wheels away from the other of said wheels on the same side of said vehicle whereby to maintain said tracks under tension, said means exerting less force tending to separate the wheels on each side of said vehicle than that required to support either side of said vehicle solely through engagement of the unsupported lower run portion of the track on the same side of said vehicle with an object over which said lower run travels, and pressure-equalizer means associated with said track-tensioning means for maintaining substantially an equal force tending to separate the two wheels on each side of said vehicle regardless of the shiftable position of either of said shiftable wheels.

16. In a tractor vehicle, in combination, a frame, a pair of wheels on each side of said frame and operatively connected thereto spaced from each other longitudinally of said vehicle, an endless track trained over the wheels on each side of said vehicle, means mounting one wheel of each pair of said wheels for bodily shiftable movement toward and from the other thereof, force exerting means co-operating between said frame and each of said shiftable wheels constantly urging each of said shiftable wheels away from the other of said wheels on the same side of said vehicle whereby to maintain said tracks under tension, and means associated with said force exerting means for maintaining a substantially equal tension on both said tracks at all times regardless of the relatively shiftable positions of said shiftable wheels.

LEWIS B. MERRILL.

REFERENCES CITED

The following references are of record in the file of this patent:

UNITED STATES PATENTS

| Number | Name | Date |
|---|---|---|
| 1,245,287 | Trethewey | Nov. 6, 1917 |
| 1,297,291 | Bowling | Mar. 11, 1919 |
| 1,367,992 | Schneider | Feb. 8, 1921 |
| 1,861,866 | Knox et al. | June 7, 1932 |
| 1,981,867 | Knox et al. | Nov. 27, 1934 |